United States Patent Office 3,498,849
Patented Mar. 3, 1970

3,498,849
METHODS OF MANUFACTURING CLAD ALUMINIUM ALLOYS
John Worthington Munday, Slough, and Jeffrey Ernest Tomlinson, Chalfont, St. Giles, England, assignors to The British Aluminium Company Limited, London, England, a company of Great Britain
No Drawing. Application Mar. 1, 1966, Ser. No. 530,767, now Patent No. 3,342,565, dated Sept. 19, 1967, which is a continuation-in-part of application Ser. No. 244,929, Dec. 17, 1962. Divided and this application May 8, 1967, Ser. No. 636,644
Claims priority, application Great Britain, Dec. 18, 1961, 45,272/61
Int. Cl. C22f 1/04; C21d 7/14
U.S. Cl. 148—11.5                      11 Claims

ABSTRACT OF THE DISCLOSURE

This invention is concerned with the provision of clad aluminium alloys having proof stress, tensile strength and creep resistance characteristics at elevated temperatures of the order 150° C. which make such clad alloys particularly, but not exclusively, suitable for use as aircraft skins.

The clad aluminium alloys produced according to the invention have a coarse grained core of a heat-treatable aluminium having a grain size coarser than 600/750/1000 grains per linear inch in the three mutually perpendicular directions of lengthwise of the sheet, width of the sheet and thickness of the sheet respectively. A cladding is provided for the core, the cladding being aluminium alloyed with 0.4–1.5% magnesium, 0.3–1.3% silicon, 0–1.5% zinc and a total of 0–1% of manganese or chromium or a mixture thereof. The defined coarse grain size of the core is produced by cold rolling the clad aluminium alloy material to produce a reduction thereof and then subjecting the cold rolled material to a heat treatment which is selected in relation to such reduction to produce the desired grain size.

CROSS-REFERENCES TO RELATED APPLICATIONS

This application is a division of our application Ser. No. 530,767 filed Mar. 1, 1966, now Patent No. 3,342,-565, which is a continuation-in part of our application Ser. No. 244,929 filed Dec. 17, 1962 and now abandoned.

BACKGROUND OF THE INVENTION

Aluminium alloy materials in clad sheet form may have many applications, an important one of which is their use as aircraft skins. The materials commonly used for this purpose have a core of aluminium alloyed with copper and possibly other elements such as silicon, manganese, magnesium, iron and nickel and a cladding on at least one but usually both faces of the core of pure aluminium or aluminium alloyed with 1% zinc. Such materials are produced by a process involving a heavy final cold rolling reduction of the order of 50% followed by solution treatment in a salt bath. The amount of cold rolling reduction imparted to the material determines the grain size of the core—after solution treatment—and the heavier the reduction, the finer is the grain size. The conventional materials with a 50% cold rolling reduction have a core with a relatively small grain size which aids in the attainment of a level of proof stress in the material adequate for the purpose in view. The advent of aircraft and the like capable of flying at supersonic speeds has resulted in the requirement for materials capable of withstanding higher temperatures than heretofore without deleterious effects. Thus, for example, an aircraft flying at Mach 2–2.5 will generate a skin temperature of 120–150° C. At such temperatures, the conventional clad aluminium alloy materials have been found to lose strength and to creep to an undesirable extent.

The fatigue limit of conventional clad sheet is lowered by a percentage which is out of all proportion to the amount of aluminium cladding present. Thus the fatigue limit of the clad materials may be reduced by as much as 45% compared with that of the core material when only 4½% per side of aluminium cladding is present. This basic difference in fatigue limit of the clad sheet, compared with that of the core material, is at its highest when superimposed static loading is at a low level of steady applied stress. Conversely, it is substantially reduced when the steady applied stress is at a high level. In modern supersonic transport aircraft, the steady design stress is at a low value so that any advantage which can be gained by improving the fatigue strength of the clad sheet will be at a maximum.

It is an object of the present invention to provide an improved clad aluminium alloy material and a method of manufacturing same which material shall be particularly, but not exclusively, suitable for use in the manufacture of skins for aircraft and which shall exhibit proof stress, tensile strength and creep resistance characteristics at elevated temperatures of the order of 150° C. which are adequate for the purpose in view.

It is a further object of the present invention to provide a clad aluminium alloy material having an improved fatigue strength relative to conventional materials.

As mentioned above, a core having a fine grain size gives higher proof stresses than a core having a coarse grain size in the solution treated condition due to the reduction in the latter of the mechanical keying effect in the core material. At the same time, however, a fine grain core has a lower creep resistance than a coarse grain core due to the larger number of discontinuities which provide concentration points for creep influence at the grain boundaries.

SUMMARY OF THE INVENTION

We have now found that an improved clad aluminium alloy material suitable for the purpose in view and characterised by proof stress, tensile strength and creep resistance at elevated temperatures of the order of 150° C. can be produced by providing a coarse grained core of a heat-treatable aluminium alloy having a grain size coarser than 600/750/1000 grains per linear inch in the three mutually perpendicular directions of lengthwise of the sheet, width of the sheet and thickness of the sheet respectively, and by selecting a specific cladding for the core which cladding has a strength approaching that of the core material thereby improving the fatigue strength of the composite material. The cladding selected is aluminium alloyed with 0.4–1.5% magnesium, 0.3–1.3% silicon, 0–1.5% zinc and a total of 0–1% of manganese or chromium or a mixture thereof. The manganese or chromium, when present, have the effect of inhibiting grain growth in the cladding and there should desirably be at least 0.1% of one or other or both these elements present and preferably at least 0.4%. All percentages specified are by weight.

The improved aluminium alloy of the present invention has an improved creep resistance due to the coarse grain size of the core and has an improved fatigue strength due to the selection of the defined alloy for the cladding. Any slight loss of fatigue strength due to the coarse grain size of the core is more than off-set by the greatly improved fatigue strength resulting from the selection of the defined cladding material. Additionally, the slight lowering of proof stress due to the coarse grain size of the core material is adequately compensated by the improvement of the composite sheet strength brought about by the selected cladding.

The desired coarse grain size of the core is brought about in one of two ways. It may be achieved by a relatively light cold-rolling reduction step which reduces the thickness of the composite material by less than 25% and preferably of the order of 10% to secure a grain size after subsequent solution treatment in a salt bath which grain size is about twice as large as that resulting from the conventional cold rolling reduction followed by solution treatment. Alternatively, it may be achieved by heavier rolling reduction, e.g. more than 20% and preferably more than 30%, followed by an annealing step in which the rolled material is exposed to a temperature which increases at a rate of about 70° C. per hour to a maximum temperature of about 400° C., followed by a subsequent solution treatment in a salt bath. The annealing step is carried out in the range of re-crystallisation temperatures of the core material so as to enlarge the grain size produced by the heavier rolling reduction to the acceptable grain size of coarser than 600/750/1000 defined above.

We have found that a cold rolling reduction of 30% followed by annealing and solution treatment will yield a core grain size equivalent to that produced by a cold rolling reduction of 10% followed by solution treatment. This has an important production advantage in the manufacture of wide sheets of comparatively thin gauge since it offers the possibility of adequate control over the shape and gauge of the resultant sheet which cannot be achieved with the same facility with the 10% reduction procedure.

It will be observed that the salt bath solution treatment which takes place at temperatures of 500°–530° C. has little effect on grain growth as the rate of heating of the material is extremely rapid and the material attains the temperature of the bath in a matter of seconds and spends only a very small fraction of this time at a temperature within the range of temperatures at which crystal growth occurs.

It will also be observed that the desired grain size of the core is produced by a combination of cold working and heat treatment. Thus, the finer is the grain size produced by the cold working step so the greater must be grain growth induced by the annealing step. In the limit, when the cold working reduction is sufficiently small, the grain size is sufficiently large, and the annealing step is omitted.

According to the present invention, there is provided a method of manufacturing a clad aluminium alloy material which comprises cold rolling a clad aluminium alloy material having a core of substantially re-crystallised heat treatable aluminium alloy and a cladding on at least one face of the core of aluminium alloyed with from 0.4–1.5% magnesium, 0.3–1.3% silicon, 0–1.5% zinc and a total of 0–1% of at least one of the elements manganese and chromium, all percentages being by weight, and subjecting the cold rolled material to a heat treatment selected in relation to the reduction imparted by the cold rolling to produce a grain size in the core coarser than 600/750/1000 grains per linear inch in the three mutually perpendicular directions of lengthwise of the sheet, width of the sheet and thickness of the sheet respectively.

The total of manganese and chromium, when present in the cladding, should desirably be at least 0.1% and, preferably, at least 0.4%. Chromium is about twice as effective as manganese as a grain growth inhibitor. Thus, a cladding having a chromium content of 0.2% would not require any manganese addition.

The proportion of zinc in the cladding, when present, should desirably be at least 0.2%.

According to one embodiment of the invention, the cold rolled material is subjected to solution treatment, e.g. in a standard salt bath at about 500° C., without any intervening thermal treatment when the reduction produced by the cold rolling step is less than 25%.

According to another embodiment of the invention, the cold rolled material is subjected to heat treatment or annealing prior to solution treatment when the reduction produced by the cold rolling step is greater than 20%, the rate of temperature rise during the heat treatment or annealing being selected in relation to the precentage reduction produced by the cold rolling step to produce the desired grain size in the final solution treated product.

At least a part of any manganese content of the cladding may be replaced by chromium.

It will be appreciated that the grain size is defined in the usual manner namely grains per linear inch in the three mutually perpendicular directions of lengthwise of the sheet/long transverse or width of the sheet/short transverse or thickness of the sheet.

Examples of clad aluminium alloy materials and methods of producing same will now be described, percentages of core and cladding compositions being by weight.

EXAMPLE I

A clad sheet of aluminium alloy material composed of a core of aluminium alloy having the composition of 2.65% copper; 1.33% magnesium; 0.14% silicon; 1.00% iron; 1.07% nickel; 0.07% manganese; 0.06% zinc; 0.002% chromium; and 0.058% titanium and remainder aluminium, and a cladding on both faces having the composition 0.69% magnesium; 0.90% silicon; 0.64% manganese; 0.98% zinc; 0.40% iron; 0.024% copper; 0.001% chromium and remainder aluminium, was cold rolled from the fully re-crystallised or annealed condition to provide a reduction of 8% resulting in a sheet of 0.064 inch thick. The cladding, as is usually the case, was nominally 5% of the total sheet thickness on each side of the core giving an aggregate nominal 10% thickness for the cladding. The manganese, zinc and chromium in the core material were present as impurities and the iron, copper and chromium present in the cladding were also impurities.

The cold rolled sheet was subjected to standard solution treatment in a salt bath at a temperature of 530° C. and the product, after solution treatment was found to have a grain size in the core of 400/450/650.

The product after precipitation treatment was then tested for creep resistance by applying a tensile stress thereto of 10 tons per square inch while it was maintained at 150° C. for 1000 hours and this produced a total plastic strain of 0.064%.

EXAMPLE II

A clad sheet of aluminium alloy material having the same composition as that of the preceding example was cold rolled from the fully re-crystallised or annealed condition to provide a reduction of 30% and a final sheet thickness of 0.044 inch. The cold rolled sheet was then heat treated by annealing in an air circulation furnace at a rate of heating of 70° C. per hour up to a temperature of 400° C. and the heat treated sheet was then subjected to a standard solution treatment in a salt bath at a temperature of 530° C. After the solution treatment step, the product was found to have a grain size and a creep resistance comparable with that of the previous example.

EXAMPLE III

A clad sheet of aluminium alloy material composed of a core of aluminium alloy having the composition 2.7% copper; 1.39% magnesium; 0.14% silicon; 1.02% iron; 1.04% nickel; 0.14% manganese; 0.02% zinc; 0.005% chromium; 0.13% titanium and remainder aluminium, and a cladding on both faces having the composition 0.69% magnesium; 0.90% silicon; 0.62% manganese; 0.97% zinc; 0.40% iron; 0.024% copper; 0.001% chromium and remainder aluminium was cold rolled from the fully re-crystallised or annealed condition from a thickness of 0.0696 inch to 0.064 inch to give a reduction of 8%. The cladding was nominally 5% of total sheet thickness on each face. As in Example I, the manganese, zinc and chromium in the core material were present as impurities and the iron, copper and chromium in the cladding were also present as impurities.

The cold rolled sheet was subjected to standard solution treatment in a salt bath at a temperature of 530° C. and the product, after solution treatment, was found to have a grain size in the core of 200/250/300. The product was tested under the same conditions specified in Example I and was found to have a total plastic strain of 0.042%.

EXAMPLE IV

A clad sheet of aluminium alloy material having the same cladding as that specified in Example III and a core having the composition 2.66% copper; 1.40% magnesium; 0.14% silicon; 1.05% iron; 1.04% nickel; 0.14% manganese; 0.03% zinc; 0.006% chromium; 0.13% titanium and remainder aluminium was cold rolled from the fully re-crystallised or annealed condition from a thickness of 0.092 inch down to 0.064 inch to give a reduction of 30%. The cladding was a nominal 5% total thickness on both faces of the core.

The cold rolled sheet was then heat treated by annealing under the same conditions as those specified in Example II to coarsen the grain structure of the core and then similarly solution treated. The product was found to have a grain size of 600/617/935 and a plastic strain under the same conditions specified in Example I of 0.054%.

EXAMPLE V

A clad sheet of aluminium alloy material having the same core as that specified in Example III and a cladding on both faces having the composition 0.62% silicon; 0.40% iron; 0.25% copper; 0.12% manganese; 0.98% magnesium; 0.11% chromium and the balance aluminium was produced in the manner defined in Example III and subjected to the same tests. It was found to have a core grain size similar to that of the core of Example III and to have substantially the same properties.

It should be noted that although the claddings in the above examples all contain both manganese and chromium similar results are achieved by using only one of these elements. Although one or other or both of the elements manganese and chromium are desirably present in the cladding, it is not necessary to include either. When neither manganese is incorporated in the cladding and the material is subjected to cold rolling reduction and heat treatment to achieve the desired grain size coarser than 600/750/1000, the strength and creep resistance of the material is adequate for the purpose in view, is better than that of conventional materials but is not qute as good as that in which the cladding contains manganese or chromium or both.

EXAMPLE VI

A clad sheet of aluminium alloy material having the same cladding and core compositions as those specified in Example I was cold rolled to give a reduction of 50% and then solution treated as in Example I. The product was found to have a grain size of 900/1150/1500 and a total plastic strain under the same conditions specified in Example I of 0.136%.

The tensile creep tests were carried in standard BNF type creep machines as described by McKeown in conformity with British Standard 1487:1950.

The creep specimen with its extensometer and thermocouples attached was placed in a cold furnace and slowly raised to 150° C. over a period of 3 to 4 hours. The temperature was stabilised for a further 18–20 hours before the test load was applied. The temperature was controlled at ±1° C. The temperature of the test piece and the temperature distribution along it was checked at regular intervals by readings from Pt/Pt 10% R L thermocouples attached to the ends and centre of the parallel portion of the specimen.

The load was applied in increments and a stress/strain curve taken during loading so that Young's Modulus and elastic component of total strain could be determined. An equivalent elastic gauge length of 6.0 inches was used in calculating the strain which could be measured to ±0.002%.

The applicants have found that a clad aluminium alloy material with a core of heat-treatable aluminium alloy having a grain size coarser than 600/750/1000 has a creep resistance at temperatures of about 150° C. which is substantially superior to that of a material having a conventional finer grain size. However, the coarser grain size does result in a reduction of the proof stress and ultimate tensile strength of the material. This is however, offset by selecting as a cladding for the core aluminium alloyed with from 0.4–1.5% magnesium and 0.3–1.3% silicon and, 0 to 1% manganese and 0 to 1.5% zinc, all percentages being by weight. If desired, any manganese content of the cladding may be replaced by chromium. This is supported by the following figures showing the proof stress and tensile strength in tons per square inch in the transverse direction of five clad sheet materials of 0.036 inch gauge identified as: (I) a conventional clad sheet material having a relatively fine grained core, i.e. a core of aluminium-copper-magnesium-nickel-iron alloy and a cladding of pure aluminium, (II) a clad material having a core such as described in Examples I and II with the coarse grain size there described and a conventional cladding of pure aluminium, (III) a clad material having a core, cladding and grain size such as described in Examples I and II, (IV) a clad material having a core, cladding and grain size as described in Example III, and (V) a clad material having a core, cladding and grain size as described in Example IV.

| Material | 0.1% proof stress | Tensile strength |
|---|---|---|
| I | 21.05 | 24.96 |
| II | 20.42 | 24.39 |
| III | 21.61 | 25.69 |
| IV | 23 | 27.4 |
| V | 22.6 | 26.7 |

The cladding material employed in accordance with this invention had adequate intrinsic corrosion resistance and confers appropriate cathodic protection to the core.

The invention is primarily applicable to clad aluminium alloy materials having cores of heat-treatable aluminium alloyed with copper and possibly other metals and is particularly, but not exclusively, applicable to materials having cores conforming to B.S.S.2170; D.T.D. 5070A and Aluminium Association Designation 2024.

It will be observed that in the above Examples I to V inclusive, the cladding material included minor proportions of iron and copper as impurities. Such impurities have no significant effect on the clad material and the scope of the appendant claims is not to be limited to exclude such minor proportions of impurities which do not materially affect the characteristics of the clad alloy material.

We claim:
1. A method of manufacturing a clad aluminium alloy material which comprises cold rolling, in the range of about 8% to less than about 50% reduction in thickness, a clad aluminium alloy material having a core of substantially re-crystallised heat treatable aluminium alloy and a cladding on at least one face of the core of aluminium alloyed with from 0.4–1.5% magnesium, 0.3–1.3% silicon, 0–1.5% zinc and a total of 0–1% of at least one of the elements manganese and chromium, all percentages being by weight, and subjecting the cold rolled material to a heat treatment selected in relation to the reduction imparted by the cold rolling to produce a grain size in the core coarser than 600/750/1000 grains per linear inch in the three mutually perpendicular directions of lengthwise of the sheet, width of the sheet and thickness of the sheet respectively.

2. A method according to claim 1 wherein the cold rolled material is subjected to solution treatment without any intervening thermal treatment when the reduction produced by the cold rolling step is less than 25%.

3. A method according to claim 1 wherein the cold rolled material is subjected to heat treatment by annealing prior to solution treatment when the reduction imparted by the cold rolling step is greater than 20%, the rate of temperature used during annealing being selected in relation to the percentage reduction produced by the cold rolling step to produce the specified core grain size in the final solution treated product.

4. A method according to claim 1 wherein the cladding on each face has a nominal thickness of 5% of the total thickness of the material.

5. A method according to claim 1 wherein the reduction produced by the cold rolling step is greater than 20% and the rolled material is heat treated by annealing by raising the temperature thereof at a rate of the order of 70° C. per hour to a maximum temperature of the order of 400° C. followed by solution treatment in a salt bath to produce said defined grain size in the core.

6. A method according to claim 5 wherein the thickness of the rolled material is of the order of 0.064 inch.

7. A method according to claim 5 wherein the salt bath is maintained at a temperature of the order of 530° C.

8. A method according to claim 1 wherein the cladding alloy includes a total of at least 0.1% of at least one of the elements manganese and chromium.

9. A method according to claim 1 wherein the cladding alloy includes a total of at least 0.4% of at least one of the elements manganese and chromium.

10. A method according to claim 1 wherein the cladding alloy contains at least 0.2% by weight of zinc.

11. A method according to claim 1 wherein the core is composed of aluminium alloyed with magnesium, silicon, iron and titanium.

References Cited

UNITED STATES PATENTS

| | | | |
|---|---|---|---|
| 3,093,459 | 6/1963 | Siebel et al. | 148—127 |
| 3,133,796 | 5/1964 | Craig | 29—197.5 |
| 3,168,381 | 2/1965 | Finnegan et al. | 29—197.5 |

FOREIGN PATENTS 631,799    11/1961    Canada.

L. DEWAYNE RUTLEDGE, Primary Examiner

G. K. WHITE, Assistant Examiner

U.S. Cl. X.R.

148—12.7, 34, 127